(12) United States Patent
Schneider et al.

(10) Patent No.: US 10,598,298 B2
(45) Date of Patent: Mar. 24, 2020

(54) CONTROL VALVE AND HYDRAULIC CONTROL MODULE INCLUDING THE SAME

(71) Applicant: BorgWarner Inc., Auburn Hills, MI (US)

(72) Inventors: Kevin Schneider, Ray, MI (US); Garrett R. Holmes, Lake Orion, MI (US)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 16/113,801

(22) Filed: Aug. 27, 2018

(65) Prior Publication Data

US 2020/0063886 A1 Feb. 27, 2020

(51) Int. Cl.
*F16K 31/06* (2006.01)
*F16K 27/02* (2006.01)
(Continued)

(52) U.S. Cl.
CPC ........ *F16K 31/0658* (2013.01); *B23P 15/001* (2013.01); *F16H 61/0251* (2013.01);
(Continued)

(58) Field of Classification Search
CPC .... F16K 31/0658; F16K 51/00; F16K 27/029; F16H 61/0251; F16H 2061/0253;
(Continued)

(56) References Cited

U.S. PATENT DOCUMENTS

| 2,071,204 | A | * | 2/1937 | Hunt | ........................ | F16K 3/265 |
| | | | | | | 137/625.68 |
| 3,202,182 | A | * | 8/1965 | Haviland | .............. | F16K 11/025 |
| | | | | | | 137/625.27 |

(Continued)

FOREIGN PATENT DOCUMENTS

| CN | 102007331 A | 4/2011 |
| DE | 10340932 A1 | 3/2005 |

(Continued)

OTHER PUBLICATIONS

English language abstract for CN 102007331 extracted from espacenet.com database dated Oct. 11, 2018, 2 pages.

(Continued)

*Primary Examiner* — John Bastianelli
(74) *Attorney, Agent, or Firm* — Howard & Howard Attorneys PLLC

(57) ABSTRACT

A control valve includes a metal insert extending along an axis and presenting an interior insert surface defining a fluid passage. The control valve also includes a valve member slidably disposed in the fluid passage, and a composite valve body. The composite valve body has a first and second protrusion disposed about the axis. The first protrusion is spaced from the second protrusion along the axis. The composite valve body has a connecting bridge integral with and extending between the first and second protrusions. The connecting bridge has a first connecting side and a second connecting side spaced from the first connecting side, with the axis, the first connecting side, and the second connecting side defining a central angle between 5 and 45 degrees.

23 Claims, 17 Drawing Sheets

(51) Int. Cl.
  *B23P 15/00* (2006.01)
  *F16H 61/02* (2006.01)
  *F16K 51/00* (2006.01)

(52) U.S. Cl.
  CPC ............ *F16K 27/029* (2013.01); *F16K 51/00* (2013.01); *F16H 2061/0253* (2013.01); *Y10T 137/86622* (2015.04); *Y10T 137/86702* (2015.04)

(58) Field of Classification Search
  CPC ........... B23P 15/001; Y10T 137/86622; Y10T 137/86694; Y10T 137/86702; Y10T 137/8671
  USPC .............................. 251/366–368; 137/625.65, 137/625.67–625.69
  See application file for complete search history.

(56) References Cited

U.S. PATENT DOCUMENTS

| | | | | |
|---|---|---|---|---|
| 3,342,205 | A * | 9/1967 | Quinto | .................. F16K 11/065 137/375 |
| 4,971,116 | A * | 11/1990 | Suzuki | .................. H01F 7/1638 137/625.65 |
| 5,379,794 | A * | 1/1995 | Brown | .................... F23N 1/005 137/75 |
| 5,615,860 | A | 4/1997 | Brehm et al. | |
| 6,029,703 | A | 2/2000 | Erickson et al. | |
| 6,969,043 | B2 * | 11/2005 | Hirata | .................... F16J 15/024 251/129.15 |
| 8,387,254 | B2 | 3/2013 | Fathauer | |
| 8,757,209 | B2 | 6/2014 | Morgan et al. | |
| 9,027,904 | B2 | 5/2015 | Najmolhoda et al. | |
| 9,273,792 | B2 | 3/2016 | So et al. | |
| 9,927,045 | B2 | 3/2018 | Morgan et al. | |
| 2003/0201020 | A1 | 10/2003 | Kulmann | |
| 2005/0218363 | A1 | 10/2005 | Furuta et al. | |
| 2006/0054852 | A1 | 3/2006 | Kokubu et al. | |
| 2010/0243934 | A1* | 9/2010 | Kira | .................. B29C 45/14311 251/129.15 |
| 2015/0233481 | A1* | 8/2015 | Shimura | ............... F16K 27/048 137/549 |
| 2016/0201822 | A1 | 7/2016 | Takada | |
| 2016/0305566 | A1 | 10/2016 | Eszterle et al. | |
| 2017/0130858 | A1 | 5/2017 | Wardle | |
| 2017/0167617 | A1 | 6/2017 | Layne | |

FOREIGN PATENT DOCUMENTS

| | | |
|---|---|---|
| EP | 2276953 A2 | 1/2011 |
| KR | 20130047499 A | 5/2013 |
| KR | 101349451 B1 | 1/2014 |
| WO | 2009134579 A2 | 11/2009 |

OTHER PUBLICATIONS

English language abstract and machine-assisted English translation for DE 103 40 932 extracted from espacenet.com database dated Oct. 11, 2018, 20 pages.

English language abstract and machine-assisted English translation for KR 2013-0047499 extracted from espacenet.com database dated Oct. 11, 2018, 16 pages.

English language abstract and machine-assisted English translation for KR 10-1349451 extracted from espacenet.com database dated Oct. 11, 2018, 16 pages.

* cited by examiner

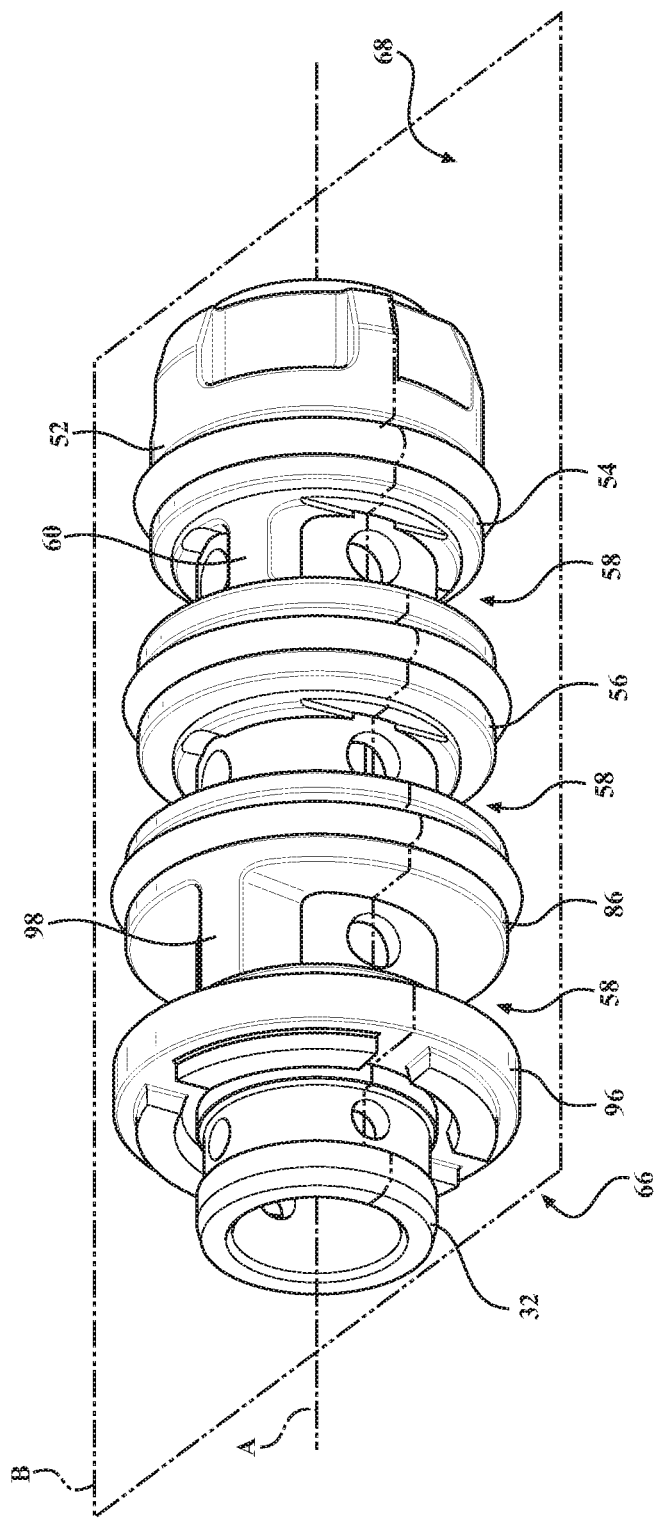

CONTROL VALVE AND HYDRAULIC CONTROL MODULE INCLUDING THE SAME

BACKGROUND OF THE INVENTION

1. Field of the Invention

The present invention relates generally to a hydraulic control module and, more specifically, to a control valve for use in a hydraulic control module.

2. Description of the Related Art

Conventional vehicle powertrain systems known in the art typically include an engine in rotational communication with a transmission. The engine generates rotational torque which is selectively translated to the transmission which, in turn, translates rotational torque to one or more wheels. Typical transmissions are shifted in discrete steps between a high-torque, low-speed mode for starting a vehicle and a high-speed, low-torque mode for vehicle operation at highway speeds. In a manual transmission, shifting is accomplished by the manual controlled engagement of gear sets. In an automatic transmission, shifting is accomplished by the automatic controlled engagement of friction elements.

To facilitate shifting and controlled engagement of the friction elements of the automatic transmission, the hydraulic control assembly typically includes a pump to provide pressurized hydraulic fluid, and a plurality of control valves for controlling the flow of hydraulic fluid through the hydraulic circuit.

Conventional control valves used to control the flow of hydraulic fluid through the hydraulic circuit include a metal insert defining a fluid passage, a valve member slidably disposed in the fluid passage for controlling the flow of hydraulic fluid, and a composite valve body disposed around the metal insert.

Composite valve bodies of conventional control valves have a first and second protrusion disposed about an axis, with the first protrusion being spaced from the second protrusion along the axis. In conventional control valves, the composite valve body defines a plurality of fluid ports about the axis between the first and second protrusion, and the metal insert defines a plurality of fluid ports about the axis, with the plurality of fluid ports defined by the composite valve body and the plurality of fluid ports defined by the metal insert allowing the flow of hydraulic fluid therethrough between the first and second protrusions to enter into the fluid passage.

To provide sufficient support and strength for the composite valve body, the composite valve body in conventional control valves includes composite material between the first and second protrusions about the axis and between each of the fluid ports defined by the composite valve body. Having this composite material between the first and second protrusions about the axis and between each of the fluid ports provides ensures sufficient support and strength for the composite valve body, especially in high pressure applications. However, this composite material between the first and second protrusions about the axis and between each of the fluid ports of conventional composite valve bodies tends to obstruct the flow of hydraulic fluid between the first and second protrusions. Specifically, the presence of excess composite material reduces a flow area defined by the plurality of fluid ports between the first and second protrusions, which decreases the amount of hydraulic fluid that flows into and out of the fluid passage of the metal insert.

In recent years, there has been a need to improve the flow of the hydraulic fluid through control valves, to decrease weight of control valves, to decrease manufacturing and packaging costs of control valves, and to decrease manufacturing time of control valves.

As such, there remains a need to provide an improved control valve that has improved flow of hydraulic fluid, is decreased in weight, that decreases manufacturing and packaging costs, and that decreases manufacturing time. Additionally, there remains a need to provide for a method of making the control valve.

SUMMARY OF THE INVENTION AND ADVANTAGES

A control valve for controlling a flow of fluid medium includes a metal insert extending along an axis, with the metal insert presenting an exterior insert surface, and an interior insert surface defining a fluid passage. The control valve also includes a valve member slidably disposed in the fluid passage for controlling the flow of fluid medium, and a composite valve body disposed around the exterior insert surface of the metal insert and about the axis. The composite valve body has a first and second protrusion disposed about the axis. The first protrusion is spaced from the second protrusion along the axis. The first protrusion, the second protrusion, and the exterior insert surface collectively defining a fluid port for allowing the flow of fluid medium into the fluid passage. The composite valve body has a connecting bridge integral with and extending between the first and second protrusions. The connecting bridge has a first connecting side and a second connecting side spaced from the first connecting side, with the axis, the first connecting side of the connecting bridge, and the second connecting side of the connecting bridge defining a central angle between 5 and 45 degrees. One embodiment is directed toward a method of forming the composite valve body.

Accordingly, the connecting bridge, particularly the central angle being between 5 and 45 degrees, improves the flow of the flow of fluid medium through the composite valve body and, in turn, through the fluid passage. Also, the connecting bridge of the control valve defining a central angle between 5 and 45 degrees decreases weight of the composite valve body and, in turn, the control valve. Additionally, the connecting bridge of the control valve defining a central angle between 5 and 45 degrees decreases manufacturing and packaging costs of composite valve body and, in turn, the control valve. Furthermore, the connecting bridge of the control valve defining a central angle between 5 and 45 degrees decreases manufacturing time of composite valve body and, in turn, the control valve.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 10B is another perspective view of the control valve of FIG. 10A, with the first and third connecting bridges being disposed in the first body half;

DETAILED DESCRIPTION OF THE INVENTION

Figure 1:
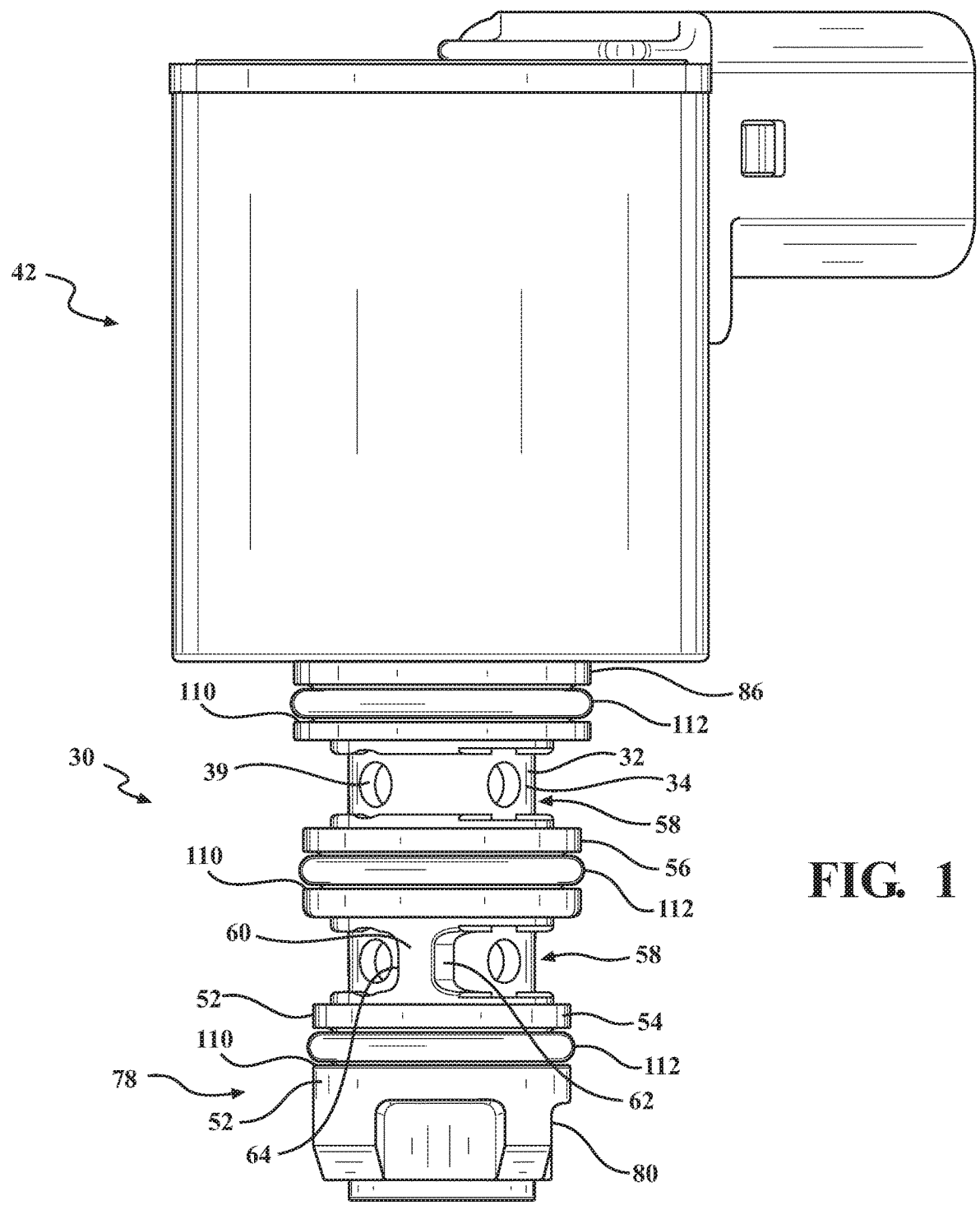
FIG. 1 is a side view of a control valve, with the control valve including a metal insert extending along an axis, and a composite valve body disposed around the exterior insert surface of the metal insert and about the axis, with the composite valve body having a first and second protrusion disposed about the axis, with the first protrusion being spaced from the second protrusion along the axis, and with the composite valve body having a connecting bridge integral with and extending between the first and second protrusions.
Figure 12:
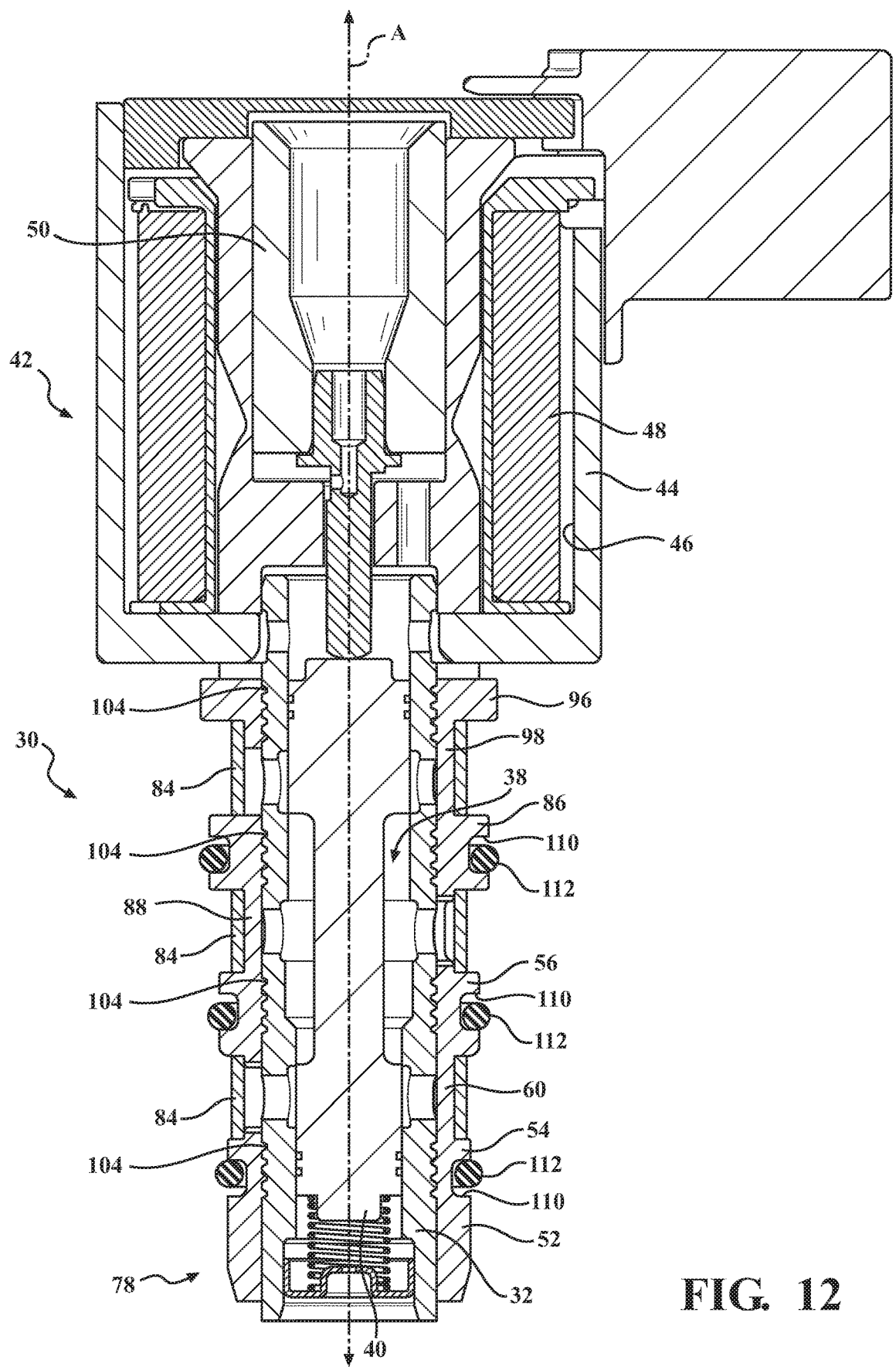
FIG. 12 is a cross-sectional view of the control valve of FIG. 4, with the control valve including a plurality of filters.
Figure 13:
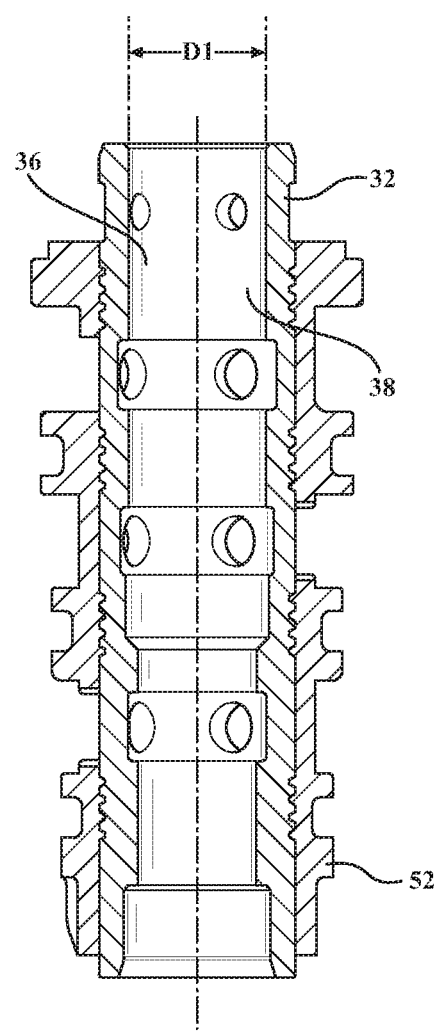
FIG. 13 is a cross-sectional view of the metal insert and the composite valve body, with the exterior insert surface of the metal insert defining a plurality of grooves, and with a portion of the composite valve body being disposed in the plurality of grooves.

With reference to the Figures, wherein like numerals indicate like parts throughout the several views, a control valve 30 for controlling a flow of fluid medium is generally shown in FIG. 1. It is to be appreciated that the control valve 30 may be a pressure control valve or a flow control valve. The control valve 30 includes a metal insert 32 extending along an axis A, as best shown in FIG. 13. The metal insert 32 presents an exterior insert surface 34, as shown in FIG. 1, and an interior insert surface 36, as shown in FIG. 13. The interior insert surface 36 defines a fluid passage 38. Typically, the metal insert 32 defines at least one insert port 39 for allowing the flow of fluid medium into the fluid passage 38. As shown in FIG. 12, the control valve 30 also includes a valve member 40 slidably disposed in the fluid passage 38 for controlling the flow of fluid medium. Typically, the fluid medium is a hydraulic fluid. In one embodiment, the valve member 40 may be further defined as a spool valve member.

With reference to FIG. 12, the control valve 30 may include an actuator 42 operably coupled to the valve member 40 for sliding the valve member 40 in the fluid passage 38. The actuator 42 may be any suitable actuator for sliding the valve member 40, such as a solenoid actuator. In one embodiment, the control valve 30 further includes a solenoid housing 44 disposed about the axis A and defining a solenoid interior 46. In such embodiments, the actuator 42 is further defined as a solenoid actuator 42. The solenoid actuator 42 may include a coil 48 disposed about the axis A and in the solenoid interior 46, and an armature 50 disposed in the solenoid interior 46 and slideable along the axis A in response to energization of the coil 48 to slide the valve member 40 along the axis A. When present, the armature 50 slides along the axis A and is typically operably coupled to the valve member 40 such that the valve member 40 slides along the axis A.

With reference to FIG. 1, the control valve 30 further includes a composite valve body 52 disposed around the exterior insert surface 34 of the metal insert 32 and about the axis A. The composite valve body 52 may comprise any suitable polymer or plastic, such as polyamides, including nylon, polyphthalamides, and liquid crystal polymers. The composite valve body 52 may be overmolded onto the metal insert 32. The composite valve body 52 may be injection molded. The metal insert 32 may be machined.

Having the composite valve body 52 may allow the functionality of the metal insert 32 to be reduced to serve as a chamber for the flow of fluid medium in the fluid passage 38, which is typically generated by a pump, and to provide precise metering control of the flow of fluid medium. Additionally, having the composite valve body 52 reduces complexities of the design of the metal insert 32, which reduces the overall cost of the metal insert 32. For example, the metal insert 32 may have a constant inner insert diameter D1 along the axis A. Furthermore, having the composite valve body 52 increases design flexibility of the composite valve body 52, which allows more design possibilities for the control valve 30. For example, allowing the composite valve body 52 to achieve other functions of the control valve 30, such as aligning the control valve 30 to a valve housing, capture O-rings, and support a filter/screen, all of which are described in further detail below.

Figure 10A:
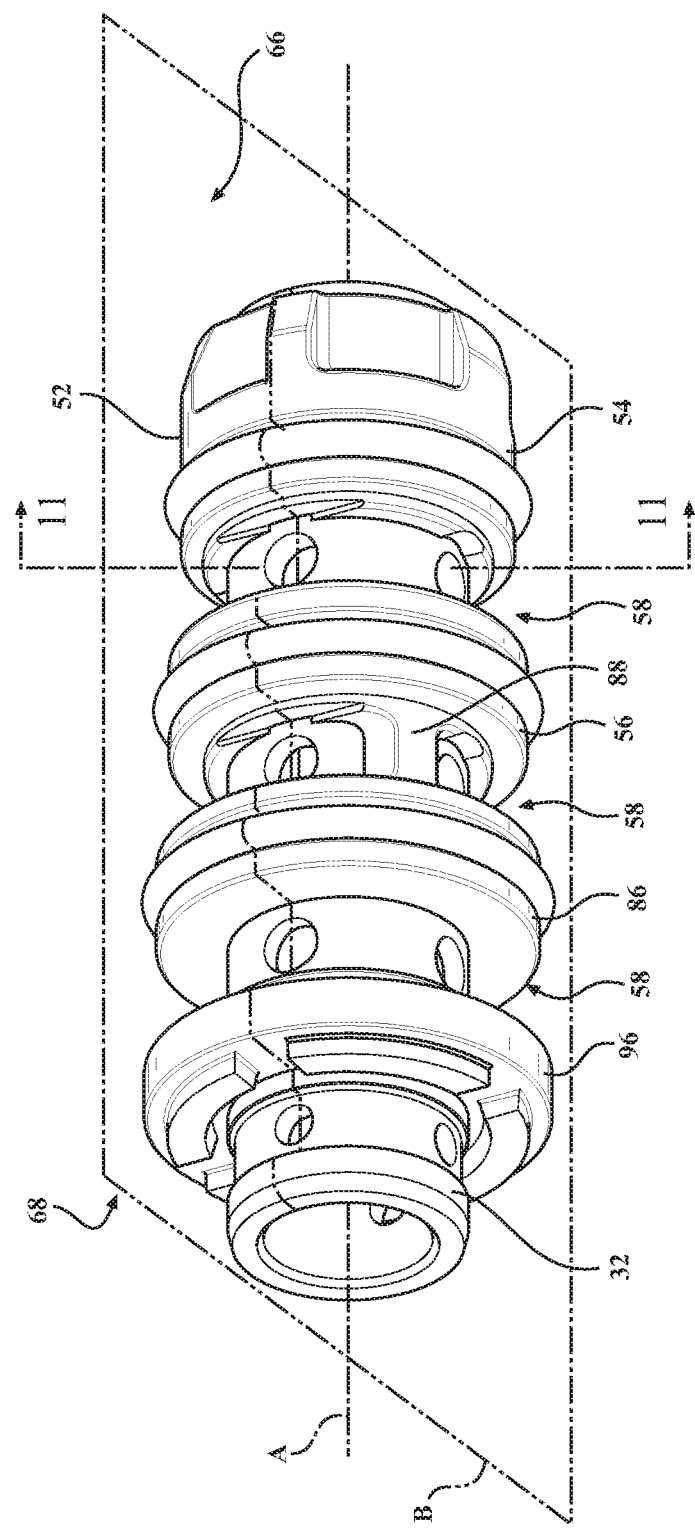
FIG. 10A is a perspective view of the control valve, with the composite valve body being divided into a first body half and a second body half, with the second connecting bridge being disposed in the second body half.

The composite valve body 52 has a first and second protrusion 54, 56 disposed about the axis A. The first protrusion 54 is spaced from the second protrusion 56 along the axis A. The first protrusion 54, the second protrusion 56, and the exterior insert surface 34 collectively define a fluid port 58, as best shown in FIG. 10A, for allowing the flow of fluid medium into the fluid passage 38. A flow area is defined by the fluid port 58, and is defined as the area defined about the axis in which the fluid medium is able to flow radially into and out of the fluid passage 38. It is to be appreciated that the flow area may be referred to as the hydraulic flow area when the fluid medium is the hydraulic fluid. As described in further detail below, a larger flow area allows a greater amount of fluid medium to flow into and out of the fluid passage 38.

Figure 11A:
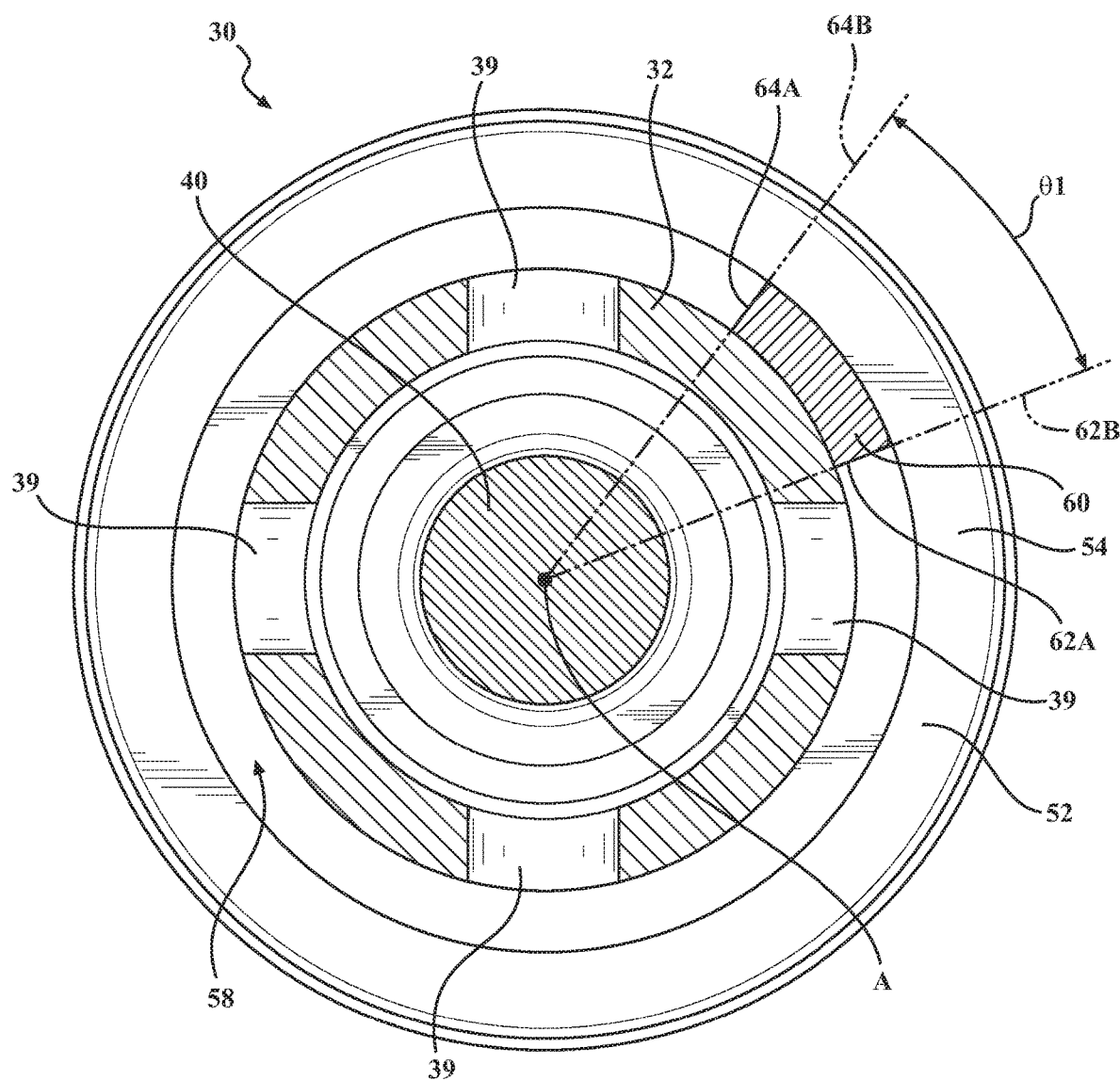
FIG. 11A is a cross-sectional view of the control valve of FIG. 10A taken along line 11-11, with the connecting bridge having a first connecting side and a second connecting side spaced from the first connecting side, and with the axis, the first connecting side of the connecting bridge, and the second connecting side of the connecting bridge defining a central angle between 5 and 45 degrees.
Figure 11B:
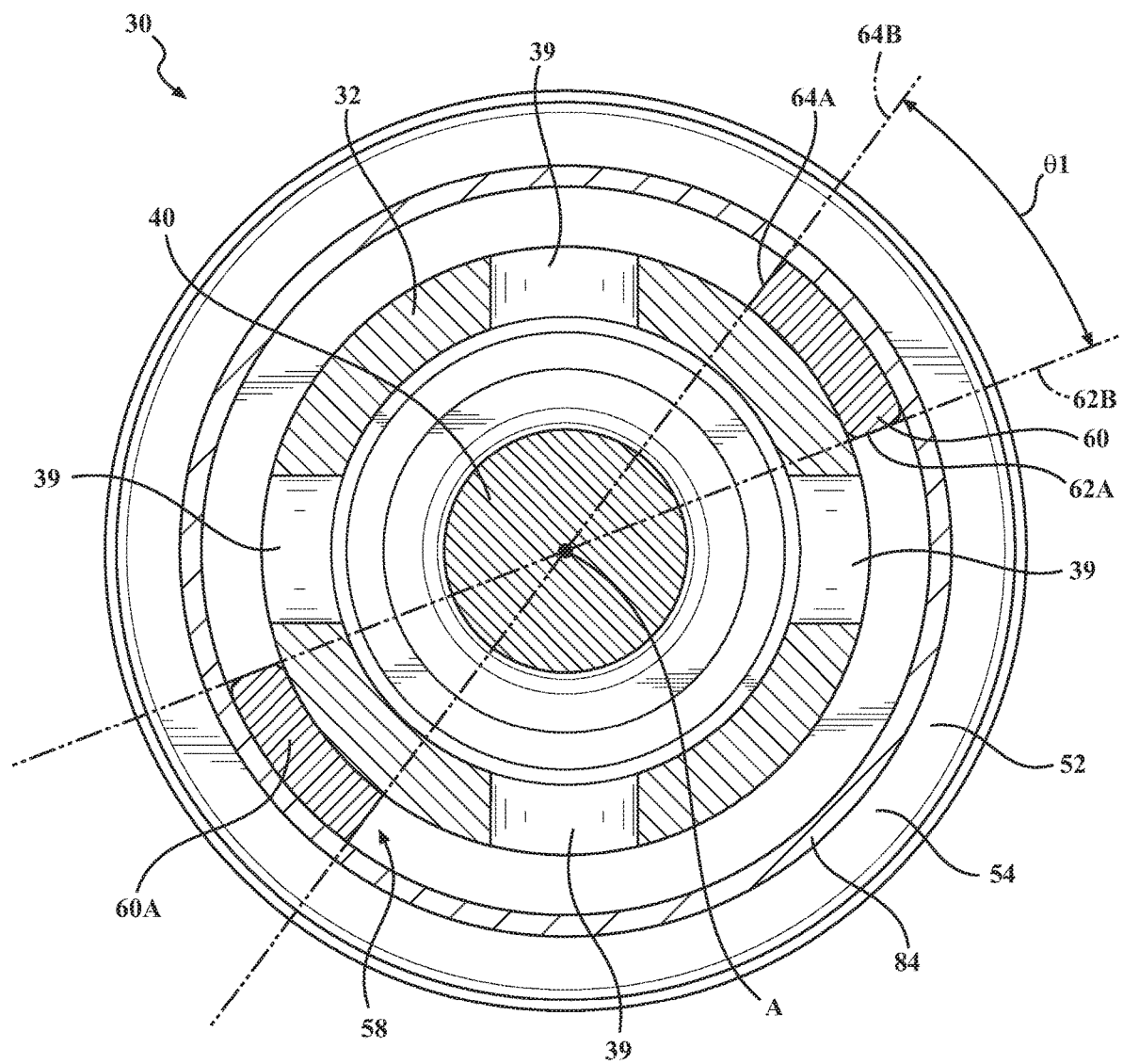
FIG. 11B is a cross-sectional view of the control valve of FIG. 10A taken along line 11-11, with the control valve including two connecting bridges between the first and second protrusion, and including the filter.
Figure 11C:
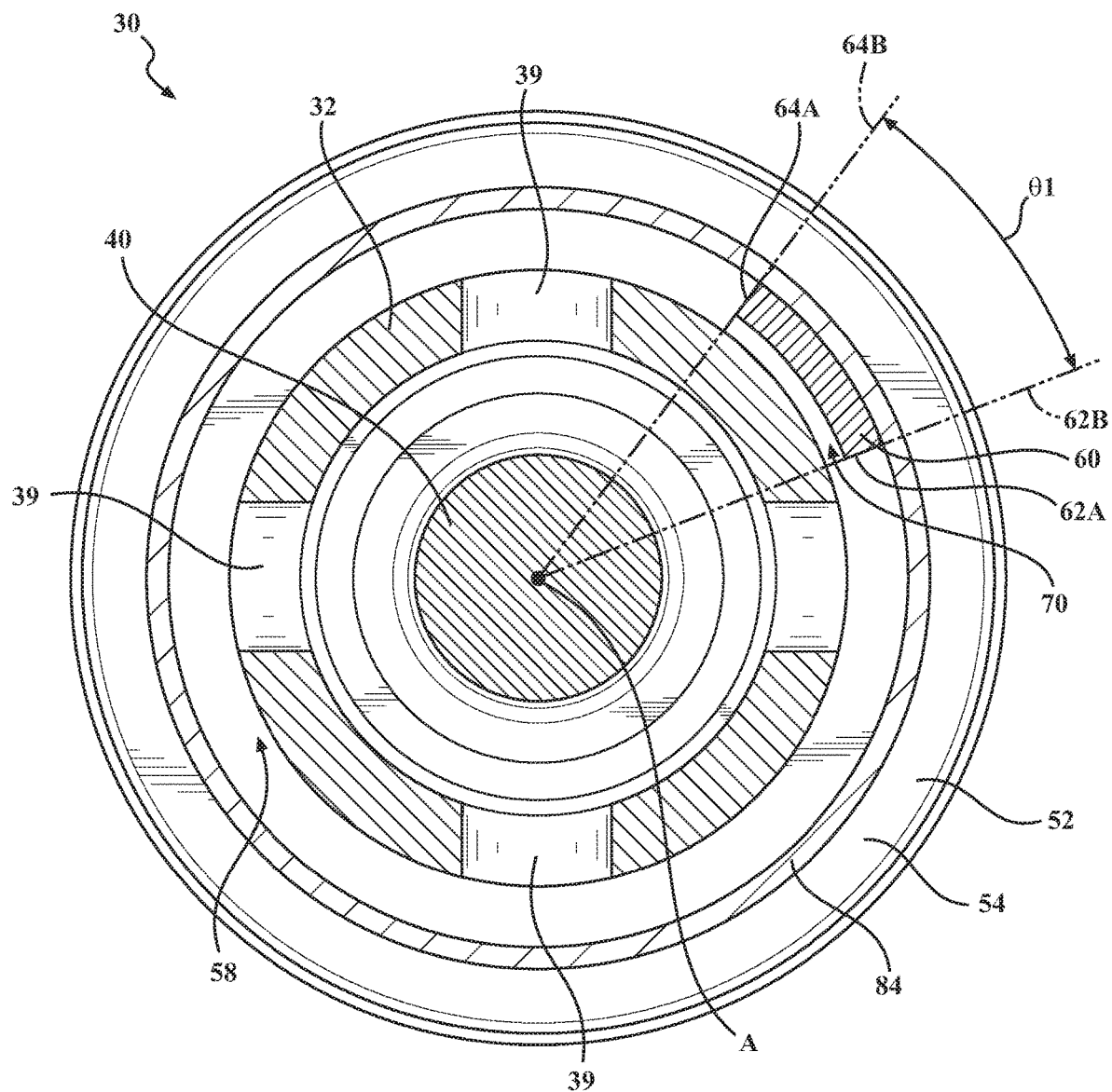
FIG. 11C is a cross-sectional view of the control valve of FIG. 10A taken along line 11-11, with the connecting bridge being radially spaced from the exterior insert surface to define a gap between the metal insert and the connecting bridge, and including the filter.

The composite valve body 52 has a connecting bridge 60 integral with and extending between the first and second protrusions 54, 56. The connecting bridge 60 has a first connecting side 62A and a second connecting side 64A spaced from the first connecting side 62A. The axis A, the first connecting side 62A of the connecting bridge 60, and the second connecting side 64A of the connecting bridge 60 define a central angle $\Theta1$ between 5 and 45 degrees, as best shown in FIG. 11A. It is to be appreciated that the central angle $\Theta1$ may not be drawn to scale throughout the Figures. As shown in FIGS. 11A-11C, the central angle $\Theta1$ may be defined by line 62B extending from the axis A and along the first connecting side 62A, and by line 64B extending from the axis A and along the second connecting side 64A.

The connecting bridge 60 of the composite valve body 52 defining the central angle $\Theta1$ between degrees 5 and 45 degrees improves the flow of the hydraulic fluid through the composite valve body 52 and, in turn, through the fluid passage 38 defined by the metal insert 32. Specifically, having the connecting bridge 60 of the composite valve body 52 defining the central angle $\Theta1$ between 5 and 45 degrees increases the flow area, which allows a greater amount of fluid medium to flow through the fluid port 58. Also, having the connecting bridge 60 of the composite valve body 52 defining the central angle $\Theta1$ between degrees 5 and 45 degrees decreases weight of the composite valve body 52 and, in turn, the control valve 30. Additionally, the connecting bridge 60 of the composite valve body 52 defining the central angle $\Theta1$ between degrees 5 and 45 degrees decreases manufacturing and packaging costs of composite valve body 52 and, in turn, the control valve 30. Furthermore, the connecting bridge 60 of the composite valve body 52 defining the central angle $\Theta1$ between degrees 5 and 45 degrees decreases manufacturing time of composite valve body 52 and, in turn, the control valve 30.

In another embodiment, the central angle $\Theta1$ is between 5 and 40 degrees. In another embodiment, the central angle $\Theta1$ is between 5 and 35 degrees. In another embodiment, the central angle $\Theta1$ is between 5 and 30 degrees. In another embodiment, the central angle $\Theta1$ is between 5 and 25 degrees. In another embodiment, the central angle $\Theta1$ is between 5 and 20 degrees. In another embodiment, the central angle $\Theta1$ is between 5 and 15 degrees. In another embodiment, the central angle $\Theta1$ is between 5 and 10 degrees. In yet another embodiment, the central angle $\Theta1$ is between 9 and 10 degrees. The smaller the central angle $\Theta1$, the greater the flow area of the fluid port 58, which, in turn, results in a greater amount of fluid medium able to flow through the fluid port 58.

In one embodiment, the metal insert 32 may extend along a plane B dividing the composite valve body 52 into a first body half 66 and a second body half 68, as best shown in FIGS. 10A and 10B. In one embodiment, the connecting bridge 60 extends between the first and second protrusions 54, 56 in the first body half 66, and the composite valve body 52 is free of any connecting bridge between the first and second protrusion 54, 56 in the second body half 68. When the composite valve body 52 is free of any connecting bridge between the first and second protrusions 54, 56 in the second body half 68, the flow area of the fluid port 58 is increased. In other words, there is no composite material disposed between the first protrusion 54 and the second protrusion 56 in the second body half 68, which allows unobstructed flow of fluid medium through the fluid port 58 and into the fluid passage 38 defined by the metal insert 32. Additionally, when the composite valve body 52 is free of any connecting bridge between the first and second protrusion 54, 56 in the second body half 68, the flow of fluid medium through the composite valve body 52 and, in turn, through the fluid passage 38 defined by the metal insert 32 increases, due to the flow area defined by the fluid port 58 increasing, which allows unobstructed flow in the second body half 68. Also, when the composite valve body 52 is free of any connecting bridge between the first and second protrusion 54, 56 in the second body half 68, the weight of the composite valve body 52 and, in turn, the control valve 30 decreases. Additionally, when the composite valve body 52 is free of any connecting bridge between the first and second protrusion 54, 56 in the second body half 68, manufacturing and packaging costs of composite valve body 52 and, in turn, the control valve 30 decreases. Furthermore, when the composite valve body 52 is free of any connecting bridge between the first and second protrusion 54, 56 in the second body half 68, manufacturing time of composite valve body 52 and, in turn, the control valve 30 decreases. The connecting bridge 60 may be the only connecting bridge (i.e., single connecting bridge) disposed between the first and second protrusions 54, 56.

In one embodiment, as shown in FIG. 11C, the connecting bridge 60 may be radially spaced from the exterior insert surface 34 of the metal insert 32 to define a gap 70 between the metal insert 32 and the connecting bridge 60. Having the gap 70 defined between the metal insert 32 and the connecting bridge 60 results in the fluid port 58 being defined 360 degrees about the axis A, which maximizes the flow of fluid medium through the fluid port 58.

Figure 14:
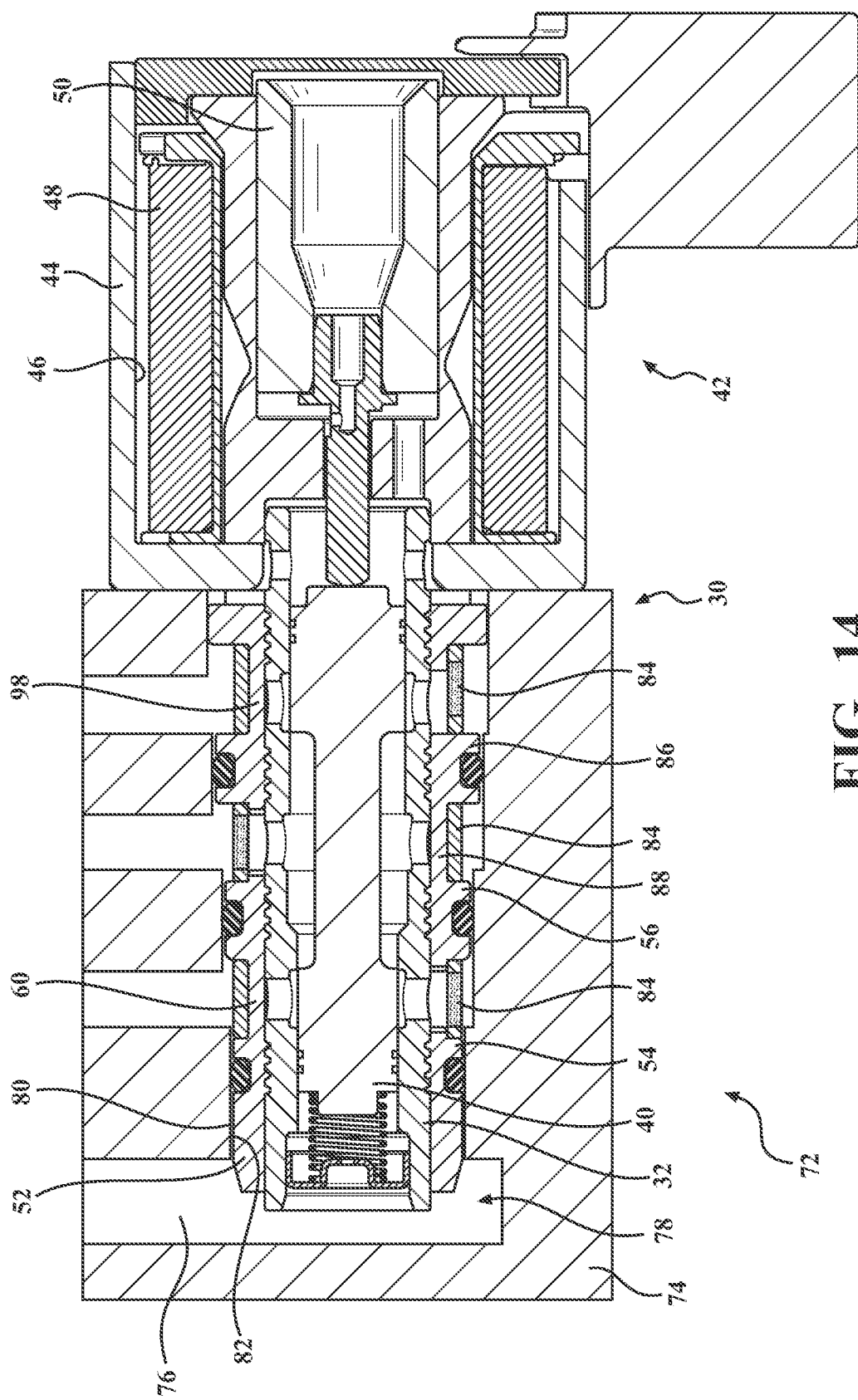
FIG. 14 is a cross-sectional view of a hydraulic control module, with the hydraulic control module including a valve housing defining a hydraulic circuit, and the control valve.

With reference to FIG. 14, the control valve 30 may be used in a hydraulic control module 72. The hydraulic control module 72 includes the control valve 30 and a valve housing 74. The valve housing 74 defines a hydraulic circuit 76. When the control valve 30 is used in the hydraulic control module 72, the control valve 30 controls the flow of fluid medium, which is typically hydraulic fluid, through the hydraulic circuit 76 defined by the valve housing 74. Specifically, movement of the valve member 40 controls the flow of fluid medium through the hydraulic circuit 76. The control valve 30 may be used in both high and low pressure applications. By way of non-limiting example, when the control valve 30 is used in high pressure applications, the control valve 30 may be used to control fluid pressure around 60 bar. When the control valve 30 is used in the hydraulic control module 72, the composite valve body 52 is coupled to the valve housing 74.

When the control valve 30 is used in the hydraulic control module 72, the first protrusion 54 may have a distal end 78 spaced from the second protrusion 56, and the first protrusion 54 may include a valve body alignment feature 80 disposed at the distal end 78, with the valve body alignment feature 80 being adapted to be engageable with the valve housing 74 for aligning the control valve 30 with respect to the valve housing 74. Typically, the valve body alignment feature 80 allows the control valve 30 to properly align with various electrical connections of the hydraulic control module 72. The valve housing 74 may have a corresponding valve housing alignment feature 82 adapted to be engaged by the valve body alignment feature 80. Having the valve body alignment feature 80 ensures that the composite valve body 52 and, in turn, the control valve 30 is correctly oriented with respect to the valve housing 74. The valve body alignment feature 80 may be configured as a slot, indentation, groove, or any other suitable configuration for aligning the control valve 30 with respect to the valve housing 74.

Figure 2:
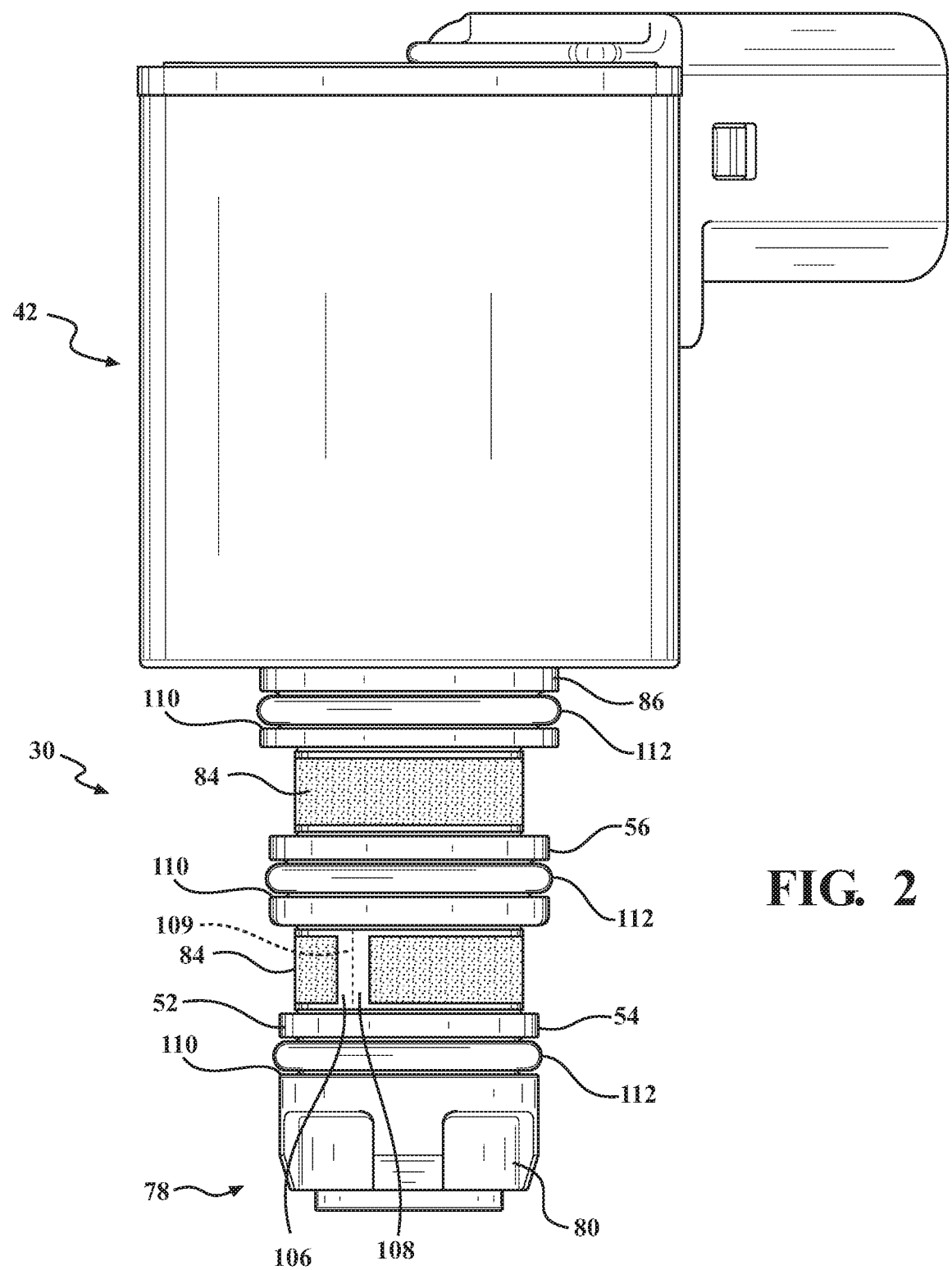
FIG. 2 is another side view of the control valve of FIG. 1, further including a filter disposed about the axis, with the connecting bridge supporting the filter such that the filter is radially spaced from the exterior insert surface of the metal insert.

The control valve 30 may include a filter 84 disposed about the axis A, as shown in FIG. 2. The connecting bridge 60 supports the filter 84 such that the filter 84 is radially spaced from the exterior insert surface 34 of the metal insert 32, as best shown in FIGS. 11B, 11C, and 12. Having the filter 84 radially spaced from the exterior insert surface 34 of the metal insert 32 increases the flow area of the fluid port 58. The filter 84 may be radially spaced 2 mm from the exterior insert surface 34. In one embodiment, the filter 84 may be further defined as a band filter.

Figure 3:
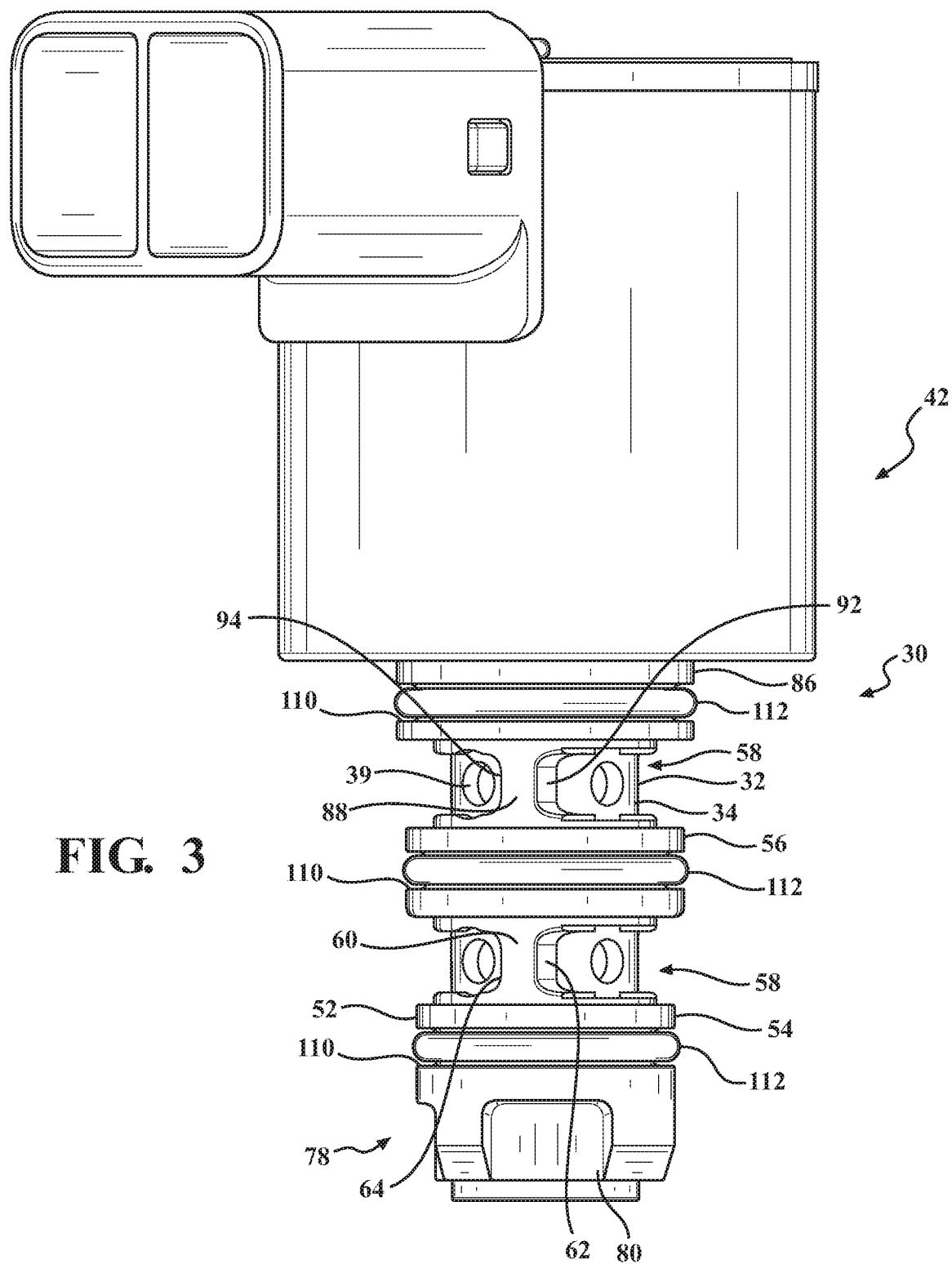
FIG. 3 is a side view of the control valve including a third protrusion disposed about the axis and spaced from the second protrusion such that the second protrusion is disposed between the first protrusion and the third protrusion along the axis, with the connecting bridge being further defined as a first connecting bridge, with the composite valve body including a second connecting bridge integral with and extending between the second and third protrusions.

As shown in FIGS. 1-3, the composite valve body 52 may further include a third protrusion 86 disposed about the axis A and spaced from the second protrusion 56 such that the second protrusion 56 is disposed between the first protrusion 54 and the third protrusion 86 along the axis A. When the composite valve body 52 includes the third protrusion 86, the composite valve body 52 may include a second connecting bridge 94 integral with and extending between the second and third protrusions 56, 86. When the second connecting bridge 94 is present, the connecting bridge 60 may be further defined as a first connecting bridge 60. When present, the second connecting bridge 94 has a first connecting side 92 and a second connecting side 94 spaced from the first connecting side 92, with the axis A, the first connecting side 92 of the second connecting bridge 94, and the second connecting side 94 of the second connecting bridge 94 defining a second central angle between 5 and 45 degrees. It is to be appreciated that the second central angle may be between 5 and 40 degrees, 5 and 35 degrees, 5 and 30 degrees, 5 and 25 degrees, 5 and 20 degrees, 5 and 15 degrees, 5 and 10 degrees, and 8 and 9 degrees, as described above with respect to the connecting bridge 60. Although not explicitly shown in the Figures, the second central angle is measured as shown with the central angle Θ1 in FIG. 11A-11C. As described above with respect to the central angle Θ1, when the composite valve body 52 includes the third protrusion 86 and the second connecting bridge 94, the second connecting bridge 94 having the second central angle between degrees 5 and 45 degrees improves the flow of fluid medium through the composite valve body 52, increases the flow area, decreases weight of the composite valve body 52, decreases manufacturing and packaging costs of composite valve body 52, and decreases manufacturing time of composite valve body 52 and, in turn, the control valve 30.

When the third protrusion 86 and the second connecting bridge 94 are present, the first connecting bridge 60 may be disposed in the first body half 66 and the composite valve body 52 may be free of any connecting bridge in the second body half 68 between the first and second protrusions 54, 56 and the second connecting bridge 94 may be disposed in one of the first and second body halves 66, 68 with the composite valve body 52 being free of any connecting bridge in the other of the first and second body halves 66, 68 between the second and third protrusions 56, 86. In one embodiment, as best shown in FIG. 1, the first connecting bridge 60 extends between the first and second protrusions 54, 56 in the first body half 66, and the second connecting bridge 94 (not shown in FIG. 1) extends between the second and third protrusions 56, 86 in the second body half 68. In this embodiment, the first connecting bridge 60 may be spaced between 135 and 225 degrees about the axis A from the second connecting bridge 94. In some embodiments, the first connecting bridge 60 may be spaced 180 degrees about the axis A from the second connecting bridge 94. When the composite valve body 52 is free of any connecting bridge between the second and third protrusions 56, 86 in the first body half 66, the flow area of the fluid port 58 is increased. In other words, there is no composite material disposed between the second protrusion 56 and the third protrusion 86 in the first body half 66, which allows unobstructed flow of the fluid medium through the fluid port 58 and into the fluid passage 38 defined by the metal insert 32. Additionally, when the composite valve body 52 is free of any connecting bridge between the second and third protrusion 56, 86 in the first body half 66, the flow of the fluid medium through the composite valve body 52 increases, the weight of the composite valve body 52 decreases, manufacturing and packaging costs of composite valve body 52 decreases, and manufacturing time of composite valve body 52 decreases, as described in detail above with respect to the connecting bridge.

In another embodiment when the third protrusion 86 and the second connecting bridge 94 are present, the second connecting bridge 94 may extend between the second and third protrusions 56, 86 in the first body half 66, with the composite valve body 52 being free of any connecting bridge between the second and third protrusions 56, 86 in the second body half 68. In such embodiments, the first and second connecting bridges 60, 88 may be axially aligned with one another along the axis A, as shown in FIG. 3.

The composite valve body 52 may include a fourth protrusion 96 disposed about the axis A and spaced from the third protrusion 86 such that the third protrusion 86 is disposed between the second protrusion 56 and the fourth protrusion 96 along the axis A, as shown in FIGS. 4-8. When the fourth protrusion 96 is present, the composite valve body 52 may include a third connecting bridge 98 integral with and extending between the third and fourth protrusions 86, 96. When present, the third connecting bridge 98 has a first connecting side 100 and a second connecting side 102 spaced from the first connecting side 100, with the axis A, the first connecting side 100 of the third connecting bridge 98, and the second connecting side 102 of the third connecting bridge 98 defining a third central angle between 5 and 45 degrees. As described above with respect to the central angle Θ1, when the composite valve body 52 includes the fourth protrusion 96 and the third connecting bridge 98, the third connecting bridge 98 having the third central angle between 5 and 45 degrees improves the flow of fluid medium through the composite valve body 52, increases the flow area, decreases weight of the composite valve body 52, decreases manufacturing and packaging costs of composite valve body 52, and decreases manufacturing time of composite valve body 52 and, in turn, the control valve 30

Figure 4:
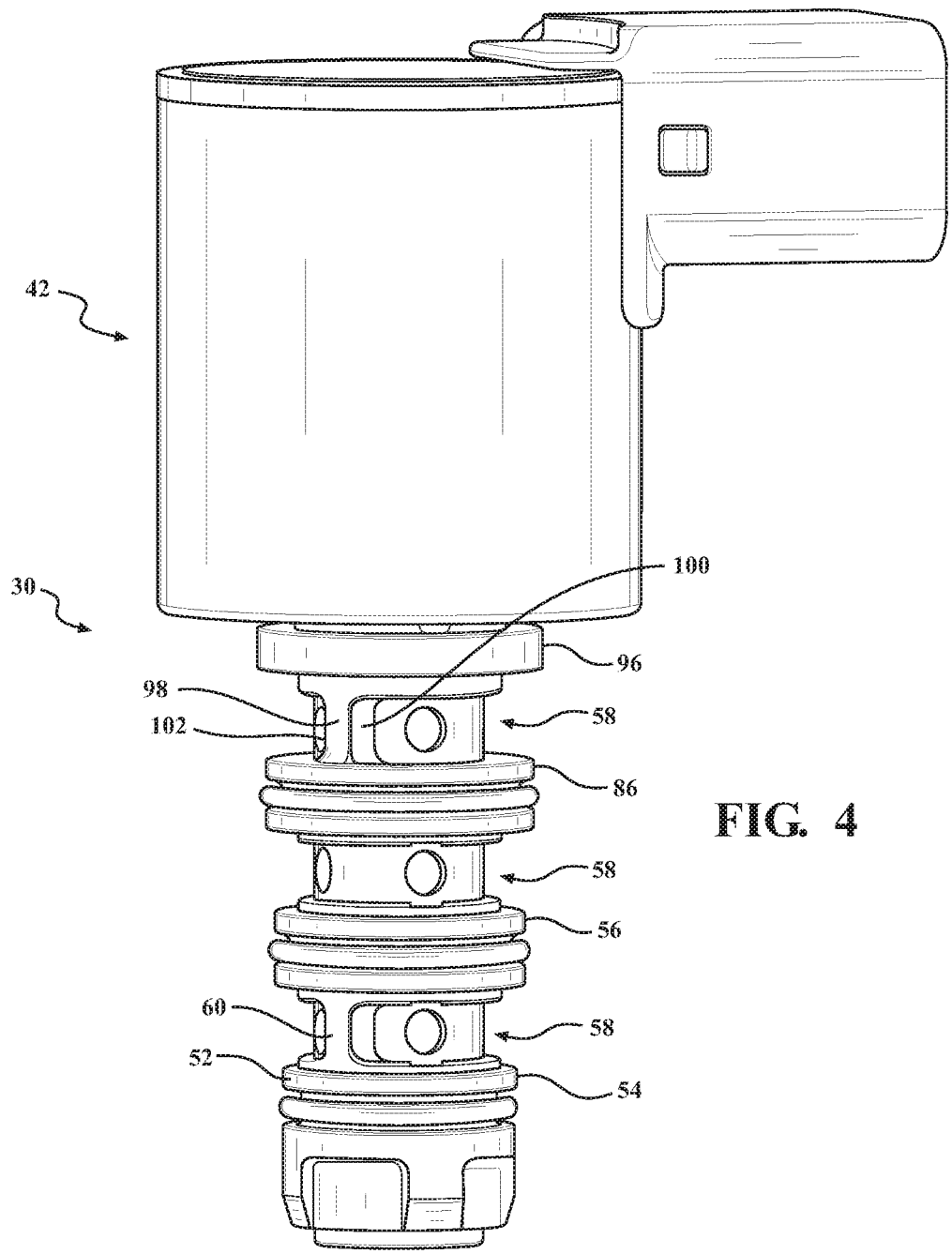
FIG. 4 is a side view of the control valve including a fourth protrusion disposed about the axis and spaced from the third protrusion such that the third protrusion is disposed between the second protrusion and the fourth protrusion along the axis, with the composite valve body including a third connecting bridge integral with and extending between the third and fourth protrusion, with the first and third connecting bridges being axially aligned with one another along the axis, and with the second connecting bridge being spaced between 135 and 225 degrees about the axis from the first and third connecting bridges.
Figure 5:
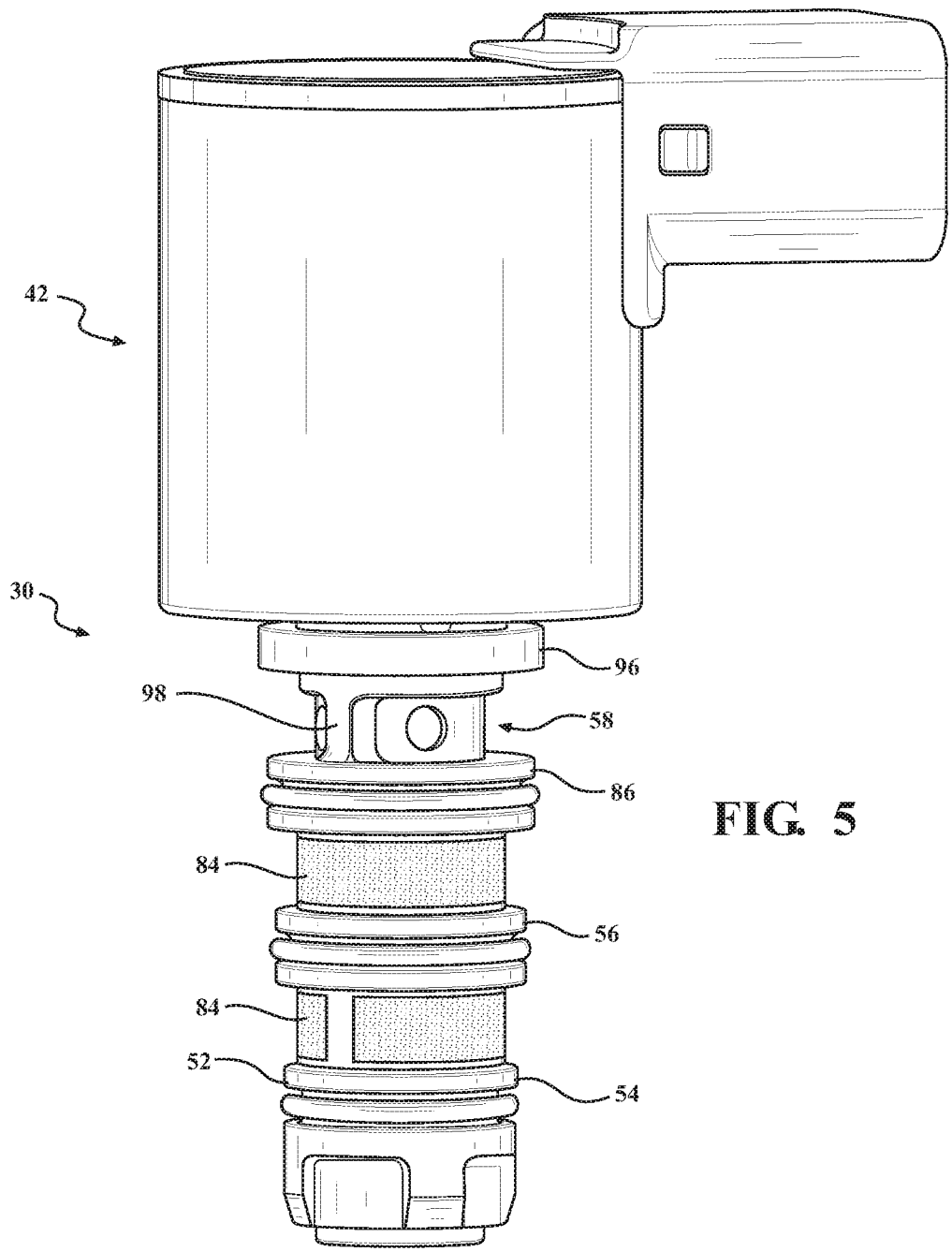
FIG. 5 is another side view of the control valve of FIG. 4, with the control valve including a filter disposed between the second and third protrusion, and between the third and fourth protrusion.
Figure 6:
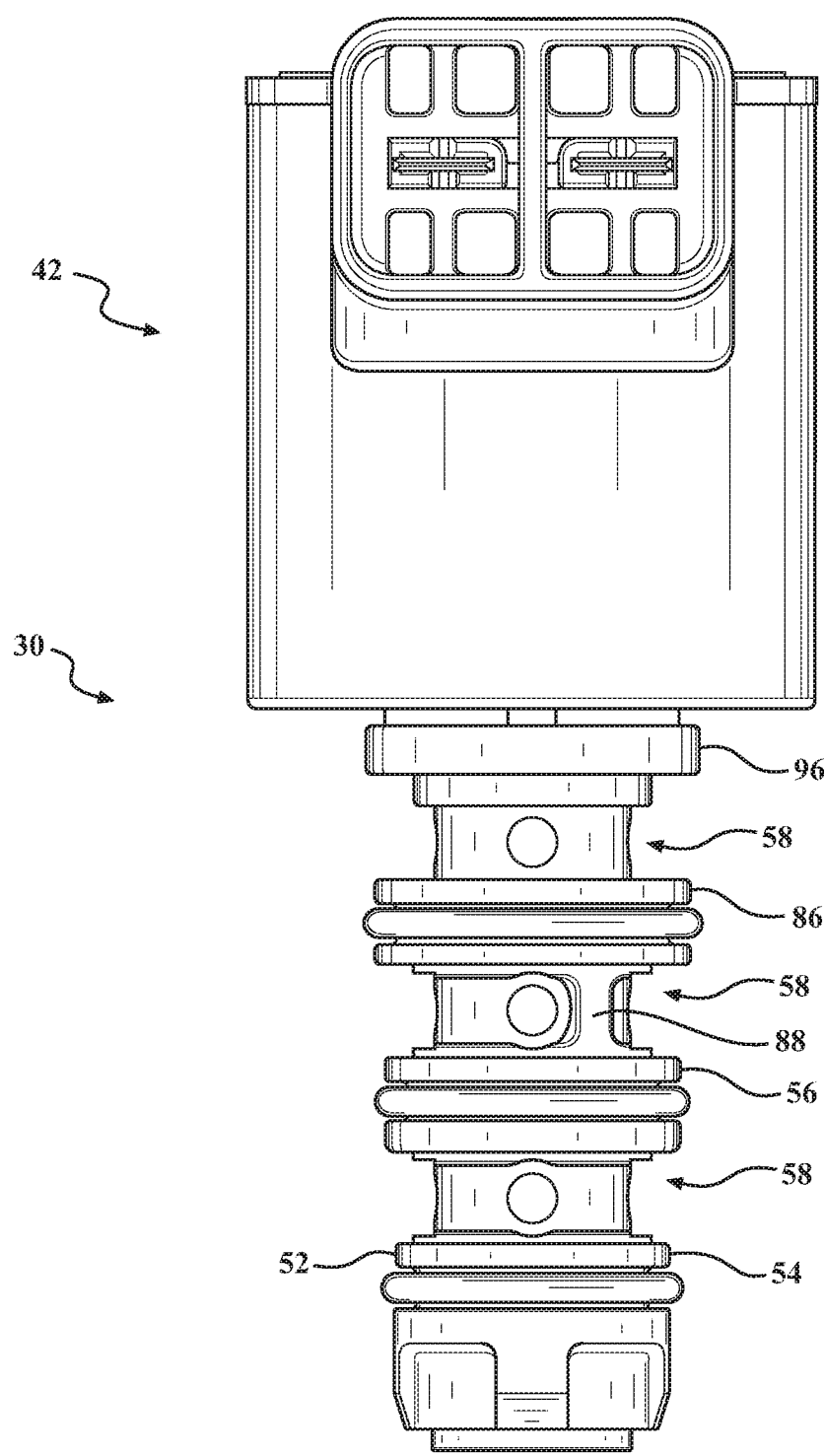
FIG. 6 is another side view of the control valve of FIG. 4 showing the second connecting bridge, with the first and third connecting bridges being spaced between 135 and 225 degrees about the axis from the second connecting bridge.
Figure 7:
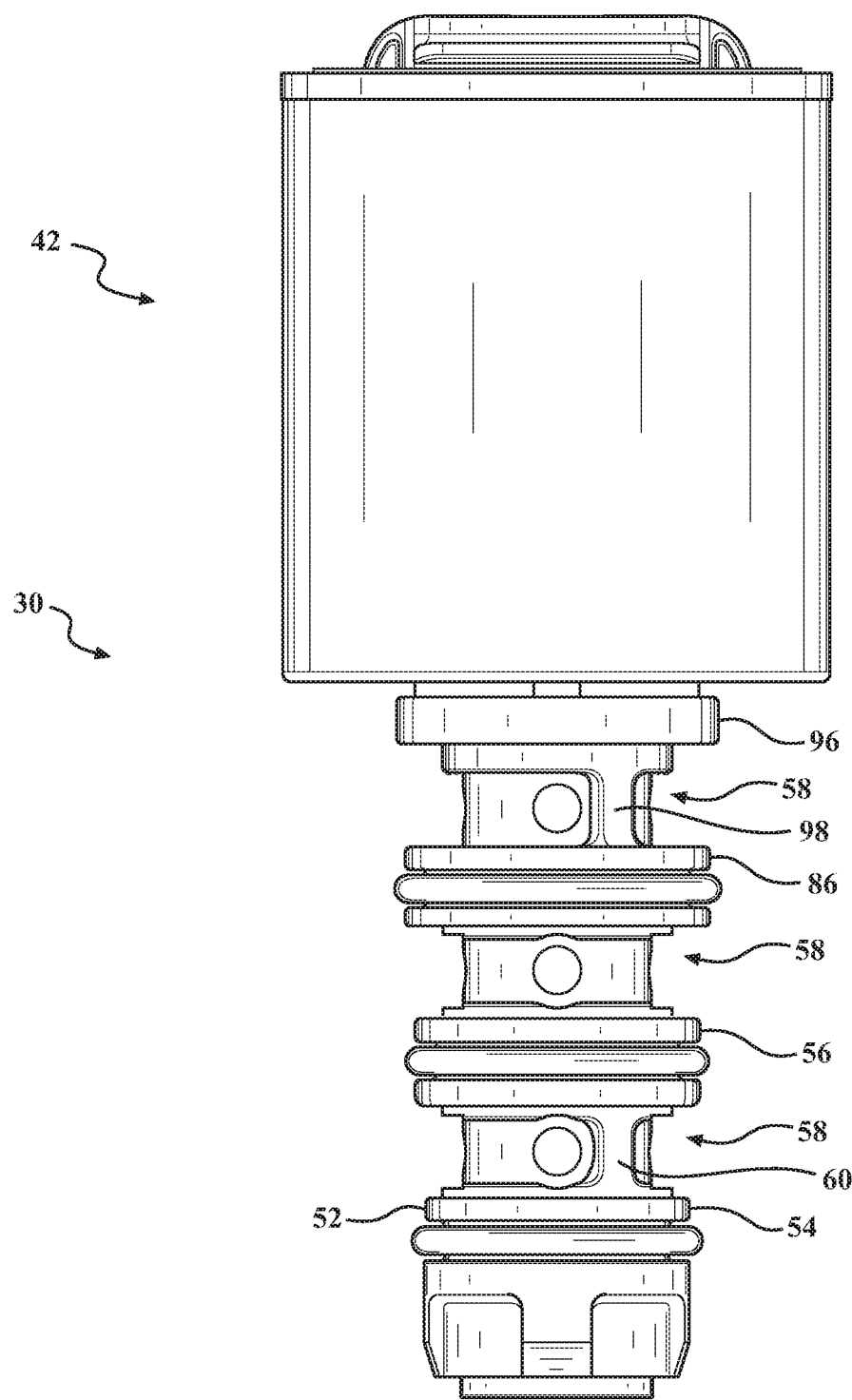
FIG. 7 is another side view of the control valve of FIG. 4 showing the first and third connecting bridges, with the second connecting bridge being spaced between 135 and 225 degrees about the axis from the first and third connecting bridges.

When present, the third connecting bridge 98 may be disposed in one of the first and second body halves 66, 68, with the composite valve body 52 being free of any connecting bridge in the other of the first and second body halves 66, 68 between the third and fourth protrusions 66, 68. In one embodiment, the first connecting bridge 60 extends between the first and second protrusions 54, 56 in the first body half 66, the second connecting bridge 94 extends between the second and third protrusions 56, 86 in the second body half 68, and the third connecting bridge 98 extends between the third and fourth protrusions 86, 96 in the first body half 66, as best shown in FIGS. 4, 6, and 7. In such embodiments, the first and third connecting bridges 60, 98 may be axially aligned with one another along the axis A, and the second connecting bridge 94 may be spaced between 135 and 225 degrees about the axis A from the first and third connecting bridges 60, 98. In some embodiments, the second connecting bridge 94 may be spaced 180 degrees about the axis A from the first and third connecting bridges 60, 98.

Figure 8:
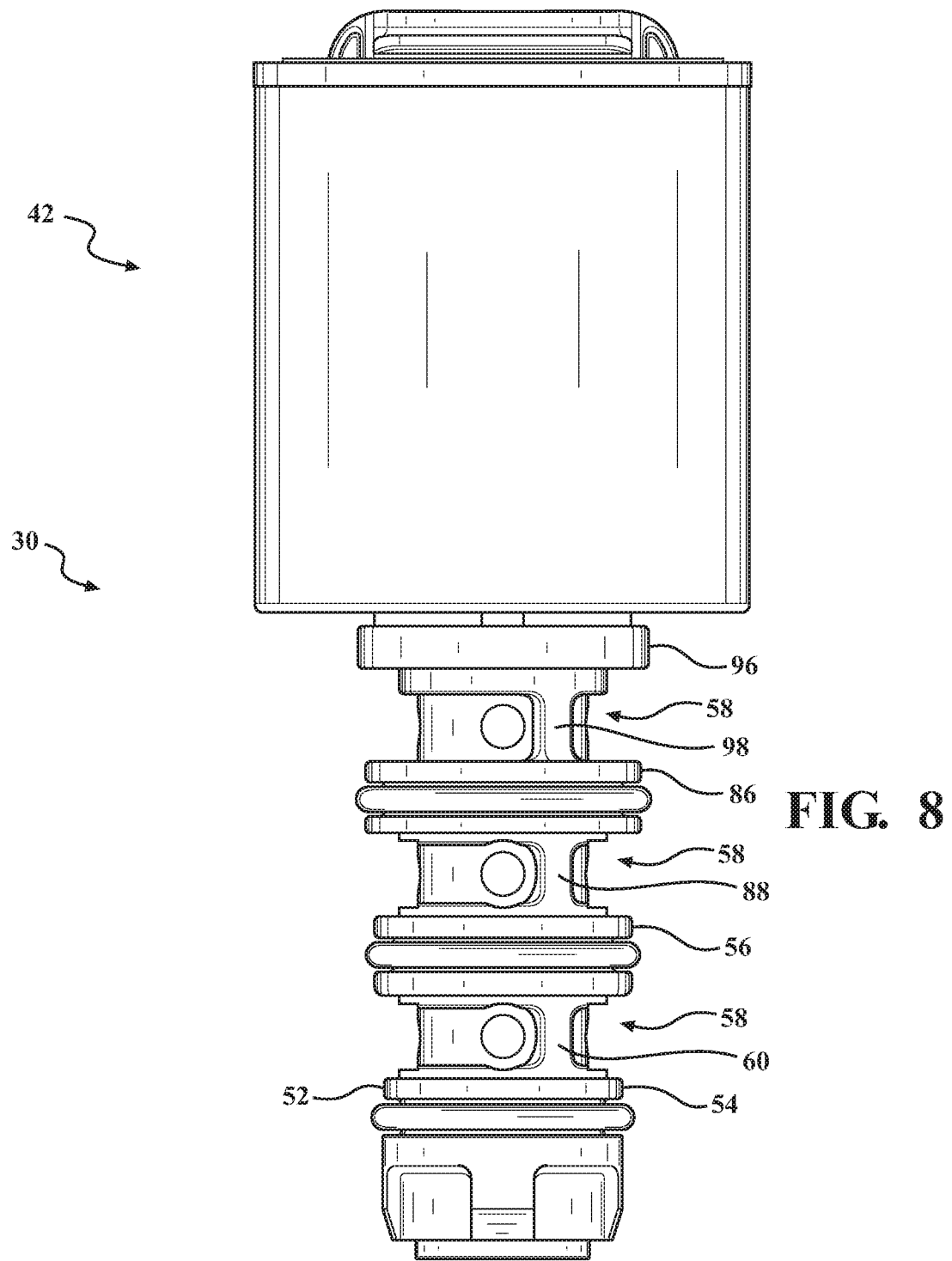
FIG. 8 is a side view of the control valve, with the first, second, and third connecting bridges being axially aligned with one another along the axis.
Figure 9:
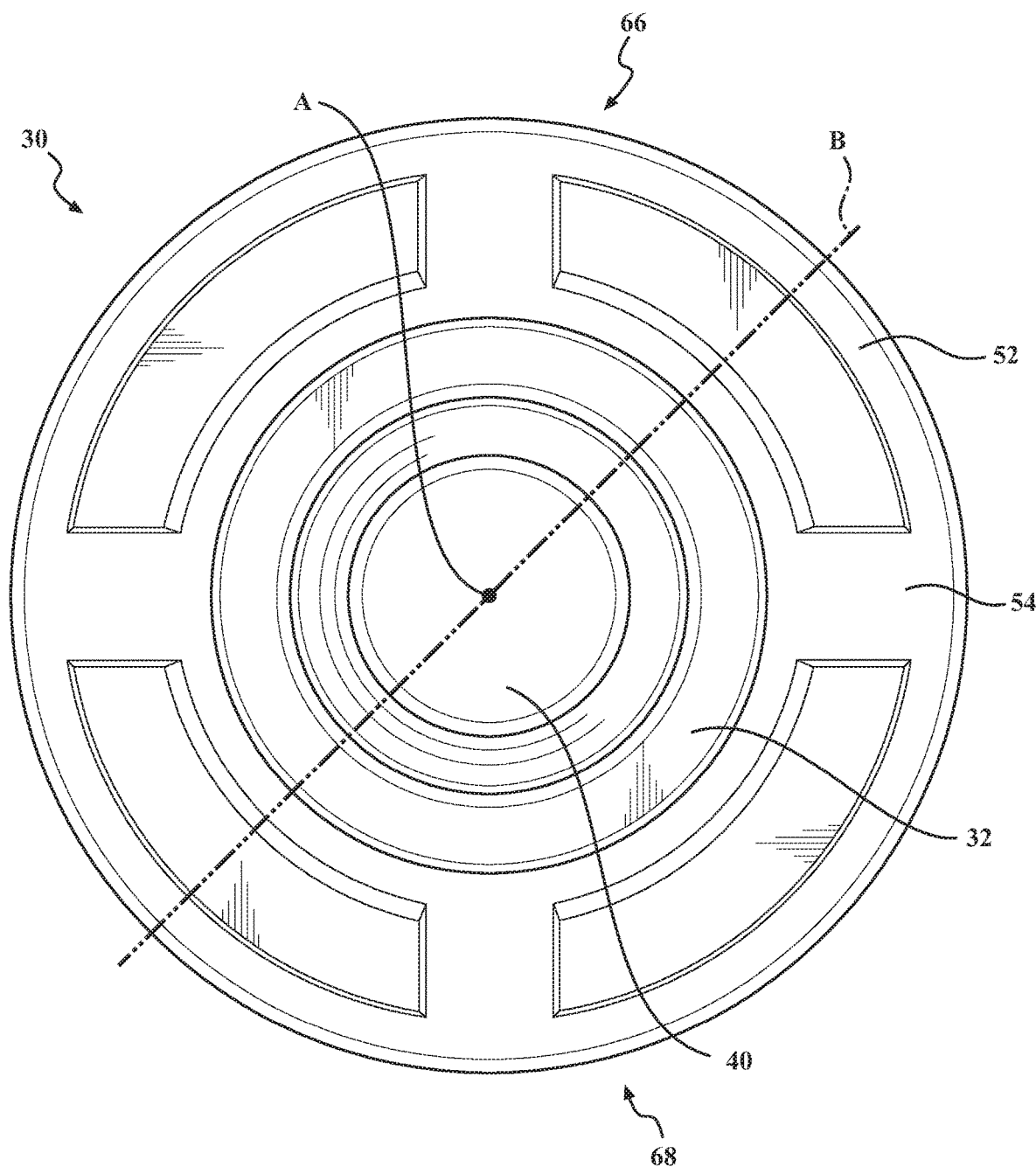
FIG. 9 is a top view of the control valve, with the metal insert extending along a plane dividing the composite valve body into a first body half and a second body half.

In another embodiment, as shown in FIG. 8, the first connecting bridge 60 extends between the first and second protrusion 54, 56 in the first body half 66, the second connecting bridge 94 extends between the second and third protrusions 56, 86 in the first body half 66, and the third connecting bridge 98 extends between the third and fourth 86, 96 protrusions in the first body half 66. In such embodiments, the first, second, and third connecting bridges 60, 88, 98 are axially aligned with one another along the axis A. In this embodiment, the composite valve body 52 may be free of any connecting bridge in the second body half 68.

Although not explicitly shown in the Figures, it is to be appreciated that the composite valve body 52 may have more than four protrusions. For example, the composite valve body 52 may have a fifth protrusion and a sixth protrusion. In such embodiments, as described above with respect to the first, second, third, and fourth protrusions 54, 56, 86, 96, the composite valve body 52 may include a fourth connecting bridge integral with and extending between the fourth protrusion 96 and the fifth protrusion, and may include a fifth connecting bridge integral with and extending between the fifth protrusion and the sixth protrusion. As also described above with respect to the first, second, third, and fourth protrusions 54, 56, 86, 96, the fourth and fifth connecting bridge may be disposed in either the first body half 66 or the second body half 68, and the composite valve body 52 may be free of any connecting bridge in the other of the first and second body halves 66, 68.

It is to be appreciated that the composite valve body 52 may include more than one connecting bridge, such as two connecting bridges 60 and 60A, between the first and second protrusions 54, 56, as shown in FIG. 11B. It is also to be appreciated that the composite valve body 52 may include more than one connecting bridge, such as two connecting bridges, between the second and third protrusions 56, 86. It is also to be appreciated that the composite valve body 52 may include more than one connecting bridge, such as two connecting bridges, between the third and fourth protrusions 86, 96. It is also to be appreciated that the composite valve body 52 may include more than one connecting bridge, such as two connecting bridges, between the fourth protrusion 96 and the fifth protrusion, and may include more than one connecting bridge, such as two connecting bridges, between the fifth protrusion and the sixth protrusion.

As best shown in FIGS. 12-14, the exterior insert surface 34 of the metal insert 32 may define a plurality of grooves 104, with a portion of the composite valve body 52 being disposed in the plurality of grooves 104. When the exterior insert surface 34 defines the plurality of grooves 104 and when a portion of the composite valve body 52 is disposed in the plurality of grooves 104, the composite valve body 52 is secured to the metal insert 32 such that the composite valve body 52 is prevented from moving along the axis A with respect to the metal insert 32. Additionally, when the exterior insert surface 34 defines the plurality of grooves 104 and when a portion of the composite valve body 52 is disposed in the plurality of grooves 104, the composite valve body 52 has increased axial strength and prevents leakage during operation of the control valve 30. The first and second protrusions 54, 56 of the composite valve body 52 may define a sealing channel 110 about the axis A adapted to receive a seal 112. Typically, the seal 112 is an O-ring.

A method of forming the composite valve body 52 of the control valve 30 includes the step of forming the first protrusion 54, the second protrusion 56, and the connecting bridge 60 from a composite material, with the first and second protrusions 54, 56 disposed around the exterior insert surface 34 of the metal insert 32, about the axis A, and spaced from one another along the axis A, with the connecting bridge 60 being integral with and extending between the first and second protrusions 54, 56. The first protrusion 54, the second protrusion 56, and the connecting bridge 60 collectively form the composite valve body 52, and with the connecting bridge having the first connecting side 62A and the second connecting side 64A spaced from the first connecting side 62A, with the axis A, the first connecting side 62A of the connecting bridge 64A, and the second connecting side 64A of the connecting bridge 60 defining the central angle $\Theta 1$ between 5 and 45 degrees.

In one embodiment, the step of forming the first protrusion 54, the second protrusion 56, and the connecting bridge 60 includes injection molding the first protrusion 54, the second protrusion 56, and the connecting bridge 60. Having the connecting bridge 60 defining the central angle $\Theta 1$ between 5 and 45 degrees ensures proper filling to form the composite valve body 52 without voids or short shots. When the step of forming the first protrusion 54, the second protrusion 56, and the connecting bridge 60 includes injection molding, a meld line is typically formed in the first protrusion 54 and the second protrusion 56, rather than a weld line, as the composite material that is injection molded forms the first protrusion 54, then the connecting bridge 60, and then the second protrusion 56. In other words, the first protrusion 54 may be formed before the connecting bridge 60, and the connecting bridge 60 may be formed before the second protrusion 56. Having a meld line, rather than a weld line, formed in the first and second protrusions 54, 56 increases the strength of the first and second protrusions 54, 56, as two parallel flow fronts are melted together to create a stronger bond of the composite material through a meld line. Additionally, having the connecting bridge 60 formed from injection molding may strengthen the connecting bridge 60, which allows greater support of the filter 84 and allows the control valve 30 to be used in higher pressure environments.

When the control valve 30 further includes the filter 84, with the filter 84 may have a first filter portion 106 and the second filter portion 108 connectable with the first filter portion 106, as shown in FIG. 2, the method may further include the steps of disposing the first filter portion 106 and the second filter portion 108 on the connecting bridge 60, and welding the first filter portion 106 to the second filter portion 108 over the connecting bridge 60 such that the connecting bridge 60 supports the first filter portion 106 and the second filter portion 108 as the first filter portion 106 is welded to the second filter portion 108. The dashed line indicated by numeral 109 shown in FIG. 2 is illustrative of a possible welding location. As described above, the filter 84 may be further defined as a band filter, with the band filter having the first filter portion 106 and the second filter portion 108. Typically, when welding the first filter portion 106 to the second filter portion 108, the first filter portion 106 overlaps the second filter portion 108. Having first filter portion 106 and the second filter portion 108 on the connecting bridge 60 provides adequate support to the filter 84 during welding of the first filter portion 106 and the second filter portion 108, and keeps the filter 84 spaced from the exterior insert surface 34 such that the flow area of the fluid port 58 is maximized.

It is to be appreciated that the step of forming the first protrusion 54, the second protrusion 56, and the connecting bridge 60 may also include forming the third protrusion 86, the second connecting bridge 88, the fourth protrusion 96, and the third connecting bridge 98. In such embodiments, the first protrusion 54 may be formed before the connecting bridge 60, the connecting bridge 60 may be formed before the second protrusion 56, the second protrusion 56 may be formed before the second connecting bridge 88, and the second connecting bridge 88 may be formed before the third protrusion 86, the third protrusion 86 may be formed before the third connecting bridge 98, and the third connecting bridge 98 may be formed before the fourth protrusion 96. In such embodiments, as described above, a meld line is formed in each of the protrusions. When injection molding is used to form the first protrusion 54, the connecting bridge 60, the second protrusion 56, the second connecting bridge 88, the third protrusion 86, the third connecting bridge 98, and the fourth protrusion 96, typically the first protrusion 54 may be formed before the connecting bridge 60, the connecting bridge 60 may be formed before the second protrusion 56, the second protrusion 56 may be formed before the second connecting bridge 88, and the second connecting bridge 88 may be formed before the third protrusion 86, the third protrusion 86 may be formed before the third connecting bridge 98, and the third connecting bridge 98 may be formed before the fourth protrusion 96, which results in a meld line in each of the first, second, third, and fourth protrusions 54, 56, 86, and 96, which increases the strength of each of the protrusions, as described above.

As described above, it is to be appreciated that the composite valve body 52 may include more than one connecting bridge between the first and second protrusions 54, 56, more than one connecting bridge between the second and third protrusions 56, 86, and/or more than one connecting bridge between the third and fourth protrusions 86, 96. In such embodiments, the composite valve body 52 may be formed through injection molding, as described above.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A method of forming a composite valve body for a control valve, with the control valve comprising a metal insert extending along an axis and presenting an exterior insert surface, and an interior insert surface defining a fluid passage, and a valve member slidably disposed in the fluid passage for controlling the flow of fluid medium, said method comprising the step of:
   forming a first protrusion, a second protrusion, and a connecting bridge from a composite material, with the first and second protrusions disposed around the exterior insert surface of the metal insert, about the axis, and spaced from one another along the axis, with the connecting bridge being integral with and extending between the first and second protrusions, with the first protrusion, the second protrusion, and the exterior insert surface collectively defining a fluid port, and with the connecting bridge having a first connecting side and a second connecting side spaced from the first connecting side;
   wherein the first protrusion, the second protrusion, and the connecting bridge collectively form the composite valve body, and wherein the axis, the first connecting side of the connecting bridge, and the second connecting side of the connecting bridge define a central angle between 5 and 45 degrees; and
   wherein the metal insert extends along a plane dividing the composite valve body into a first body half and a second body half, wherein the connecting bridge extends between the first and second protrusions in the first body half, and wherein the composite valve body is free of any connecting bridge between the first and second protrusion in the second body half.

2. The method as set forth in claim 1, wherein the step of forming the first protrusion, the second protrusion, and the connecting bridge comprises injection molding the first protrusion, the second protrusion, and the connecting bridge.

3. The method as set forth in claim 1, wherein the first protrusion is formed before the connecting bridge, and the connecting bridge is formed before the second protrusion.

4. The method as set forth in claim 1, with the control valve further comprising a filter, with the filter having a first portion and a second portion connectable with the first portion, said method further comprising the steps of:
   disposing the first and second portions of the filter on the connecting bridge; and
   welding the first portion to the second portion over the connecting bridge such that the connecting bridge supports the first portion and the second portion as the first portion is welded to the second portion.

5. A control valve for controlling a flow of fluid medium, said control valve comprising:
   a metal insert extending along an axis and presenting an exterior insert surface, and an interior insert surface defining a fluid passage;
   a valve member slidably disposed in said fluid passage for controlling the flow of fluid medium; and
   a composite valve body disposed around said exterior insert surface of said metal insert and about said axis, with said composite valve body having a first and second protrusion disposed about said axis, with said first protrusion being spaced from said second protrusion along said axis, and with said first protrusion, said second protrusion, and said exterior insert surface collectively defining a fluid port for allowing the flow of fluid medium into said fluid passage of said metal insert;
   wherein said composite valve body has a connecting bridge integral with and extending between said first and second protrusions, wherein said connecting bridge has a first connecting side and a second connecting side spaced from said first connecting side, and wherein said axis, said first connecting side of said connecting bridge, and said second connecting side of said connecting bridge define a central angle between 5 and 45 degrees; and wherein said metal insert extends along a plane dividing said composite valve body into a first body half and a second body half, wherein said connecting bridge extends between said first and second protrusions in said first body half, and wherein said composite valve body is free of any connecting bridge between said first and second protrusion in said second body half.

6. The control valve as set forth in claim 5, wherein said composite valve body further comprises a third protrusion disposed about said axis and spaced from said second protrusion such that said second protrusion is disposed between said first protrusion and said third protrusion along said axis, wherein said connecting bridge is further defined as a first connecting bridge, wherein said composite valve body further comprises a second connecting bridge integral with and extending between said second and third protrusions, wherein said second connecting bridge has a first connecting side and a second connecting side spaced from said first connecting side, and wherein said axis, said first connecting side of said second connecting bridge, and said second connecting side of said second connecting bridge defining a second central angle between 5 and 45 degrees.

7. The control valve as set forth in claim 6, wherein said second connecting bridge is disposed in one of said first and second body halves and said composite valve body is free of any connecting bridge in the other of said first and second body halves between said second and third protrusions.

8. The control valve as set forth in claim 7, wherein said second connecting bridge extends between said second and third protrusions in said second body half.

9. The control valve as set forth in claim 8, wherein said first connecting bridge is spaced between 135 and 225 degrees about said axis from said second connecting bridge.

10. The control valve as set forth in claim 7, wherein said second connecting bridge extends between said second and third protrusions in said first body half.

11. The control valve as set forth in claim 10, wherein said first and second connecting bridges are axially aligned with one another along said axis.

12. The control valve as set forth in claim 7, wherein said composite valve body further comprises a fourth protrusion disposed about said axis and spaced from said third protrusion such that said third protrusion is disposed between second protrusion and said fourth protrusion along said axis, wherein said composite valve body further comprises a third connecting bridge integral with and extending between said third and fourth protrusions, wherein said third connecting bridge has a first connecting side and a second connecting side spaced from said first connecting side, and wherein said axis, said first connecting side of said third connecting bridge, and said second connecting side of said third connecting bridge defining a third central angle between 5 and 45 degrees.

13. The control valve as set forth in claim 12, wherein said third connecting bridge is disposed in one of said first and second body halves, and wherein said composite valve body is free of any connecting bridge in the other of said first and second body halves between said third and fourth protrusions.

14. The control valve as set forth in claim 13, wherein said second connecting bridge extends between said second and third protrusions in said second body half, and wherein said third connecting bridge extends between said third and fourth protrusions in said first body half.

15. The control valve as set forth in claim 14, wherein said first and third connecting bridges are axially aligned with one another along said axis, and wherein said second connecting bridge is spaced between 135 and 225 degrees about said axis from said first and third connecting bridges.

16. The control valve as set forth in claim 13, wherein said second connecting bridge extends between said second and third protrusions in said first body half, and wherein said third connecting bridge extends between said third and fourth protrusions in said first body half.

17. The control valve as set forth in claim 16, wherein said first, second, and third connecting bridges are axially aligned with one another along said axis.

18. The control valve as set forth in claim 5, further comprising a filter disposed about said axis, wherein said connecting bridge supports said filter such that said filter is radially spaced from said exterior insert surface of said metal insert.

19. The control valve as set forth in claim 5, wherein said exterior insert surface of said metal insert defines a plurality of grooves, with a portion of said composite valve body being disposed in said plurality of grooves.

20. The control valve as set forth in claim 5, further comprising an actuator operably coupled to said valve member for sliding said valve member in said fluid passage.

21. The control valve as set forth in claim 20, further comprising a solenoid housing disposed about said axis and defining a solenoid interior, wherein said actuator is further defined as a solenoid actuator comprising a coil disposed about said axis and in said solenoid interior, and an armature disposed in said solenoid interior and slideable along said axis in response to energization of said coil to slide said valve member along said axis.

22. The control valve as set forth in claim 5, wherein said first protrusion has a distal end spaced from said second protrusion, and wherein said first protrusion comprises a valve body alignment feature disposed at said distal end and adapted to be engageable with a valve housing alignment feature for aligning said control valve with respect to the valve housing.

23. A hydraulic control module comprising:
a valve housing defining a hydraulic circuit; and
a control valve for controlling a flow of fluid medium, comprising:
a metal insert extending along an axis and presenting an exterior insert surface, and an interior insert surface defining a fluid passage,
a valve member slidably disposed in said fluid passage for controlling the flow of fluid medium, and
a composite valve body disposed around said exterior insert surface of said metal insert and about said axis and coupled to said valve housing, with said composite valve body having a first and second protrusion disposed about said axis, with said first protrusion being spaced from said second protrusion along said axis, and with said first protrusion, said second protrusion, and said exterior insert surface collectively defining a fluid port for allowing the flow of fluid medium into said fluid passage;
wherein said composite valve body has a connecting bridge integral with and extending between said first and second protrusions, wherein said connecting bridge has a first connecting side and a second connecting side spaced from said first connecting side, and wherein said axis, said first connecting side of said connecting bridge, and said second connecting side of said connecting bridge define a central angle between 5 and 45 degrees; and wherein said metal insert extends along a plane dividing said composite valve body into a first body half and a second body half, wherein said connecting bridge extends between said first and second protrusions in said first body half, and wherein said composite valve body is free of any connecting bridge between said first and second protrusion in said second body half.

* * * * *